United States Patent [19]
Brash et al.

[11] Patent Number: 5,485,586
[45] Date of Patent: Jan. 16, 1996

[54] QUEUE BASED ARBITRATION USING A FIFO DATA STRUCTURE

[75] Inventors: David L. A. Brash; Neal A. Crook, both of Berkshire, England; John M. Lenthall, Galway, Ireland

[73] Assignee: Digital Equipment Corporation, Maynard, Mass.

[21] Appl. No.: 222,500

[22] Filed: Apr. 5, 1994

Related U.S. Application Data

[63] Continuation of Ser. No. 819,187, Jan. 10, 1992, abandoned.

[51] Int. Cl.[6] ..................................................... G06F 13/36
[52] U.S. Cl. ................... 395/292; 364/240.1; 364/242.6; 364/242.92; 364/DIG. 1; 340/825.5; 370/85.6; 395/293; 395/728
[58] Field of Search ...................................... 395/250, 725, 395/275, 425, 650, 325; 340/825.5; 370/85.6

[56] References Cited

U.S. PATENT DOCUMENTS

| | | | |
|---|---|---|---|
| 4,016,539 | 4/1977 | Nanya | 340/825.5 |
| 4,136,386 | 1/1979 | Annunziator et al. | 364/200 |
| 4,473,880 | 9/1984 | Budde et al. | 395/325 |
| 4,558,429 | 12/1985 | Barlow et al. | 364/900 |
| 4,837,682 | 6/1989 | Culler | 395/325 |
| 4,964,034 | 10/1990 | Jaskowiak | 395/325 |
| 5,014,221 | 5/1991 | Mogul | 364/519 |
| 5,072,420 | 12/1991 | Conley et al. | 395/425 |
| 5,081,622 | 1/1992 | Nassehi et al. | 370/85.2 |
| 5,168,570 | 12/1992 | Eckert et al. | 395/725 |
| 5,179,705 | 1/1993 | Kent | 395/725 |
| 5,220,653 | 6/1993 | Miro | 395/275 |
| 5,239,545 | 8/1993 | Buchholz | 370/95.3 |
| 5,241,629 | 8/1993 | Barlow et al. | 395/325 |
| 5,276,887 | 1/1994 | Haynie | 395/725 |
| 5,280,591 | 1/1994 | Garcia et al. | 395/325 |
| 5,313,641 | 5/1994 | Simcoe et al. | 395/725 |
| 5,325,510 | 6/1994 | Frazier | 395/425 |
| 5,325,536 | 6/1994 | Chang et al. | 395/725 |

*Primary Examiner*—Gopal C. Ray
*Attorney, Agent, or Firm*—Kenyon & Kenyon

[57] ABSTRACT

A queue based arbiter to arbitrate between N devices of a computer system for access to a system bus which eliminates the need to maintain a history of bus transactions by queuing bus requests to track when a bus request is posted. The arbiter provides fair access to the bus by maintaining a queue of requests that come in from each resource in the computer system. This is accomplished by continually sampling the individual request lines of the devices to determine if a device is requesting access to the bus. Each time the arbiter detects a request from a device it puts an entry representative of the specific device that has requested the bus into a queue that has at least N entries. Requests are granted in the order that they are queued.

8 Claims, 8 Drawing Sheets

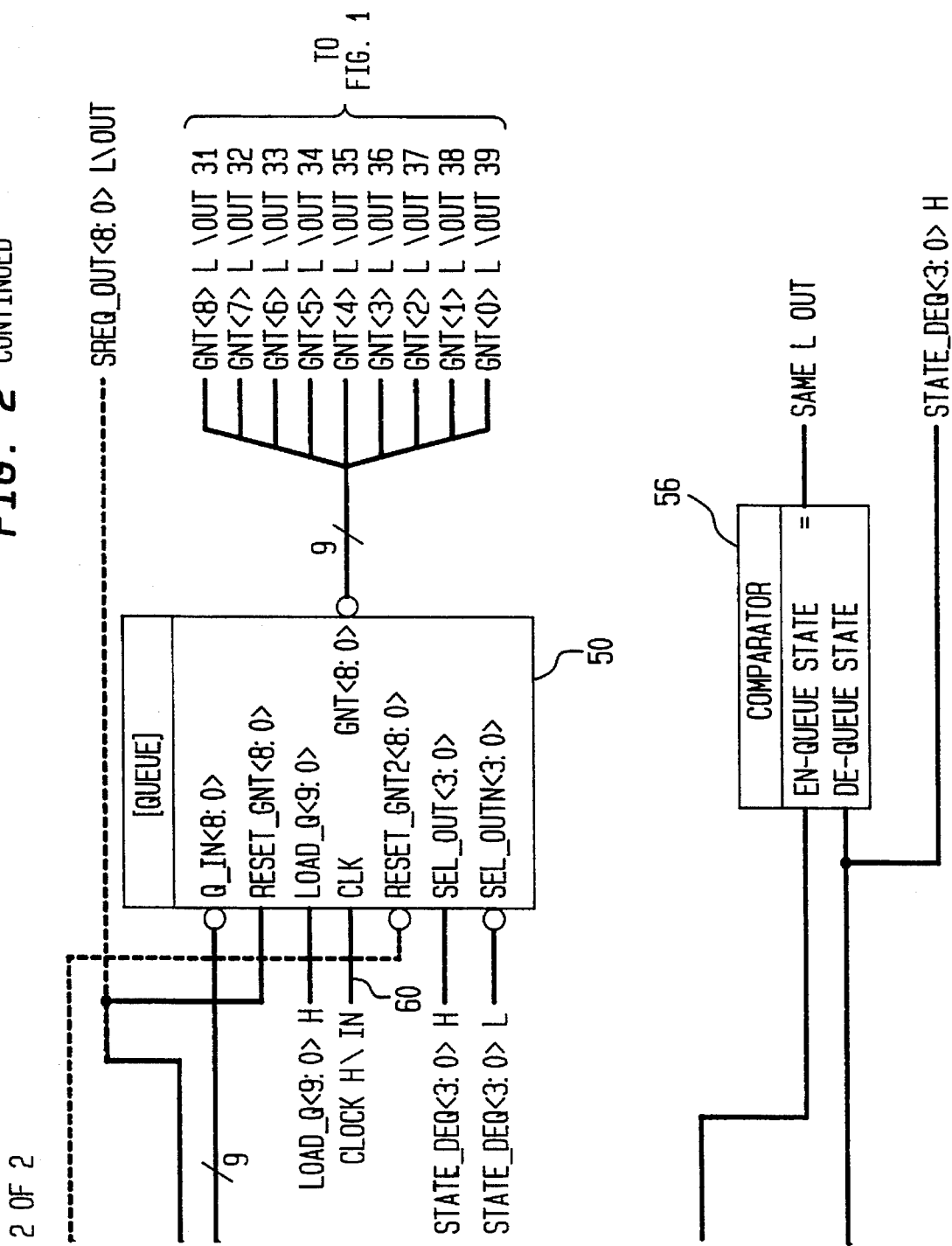

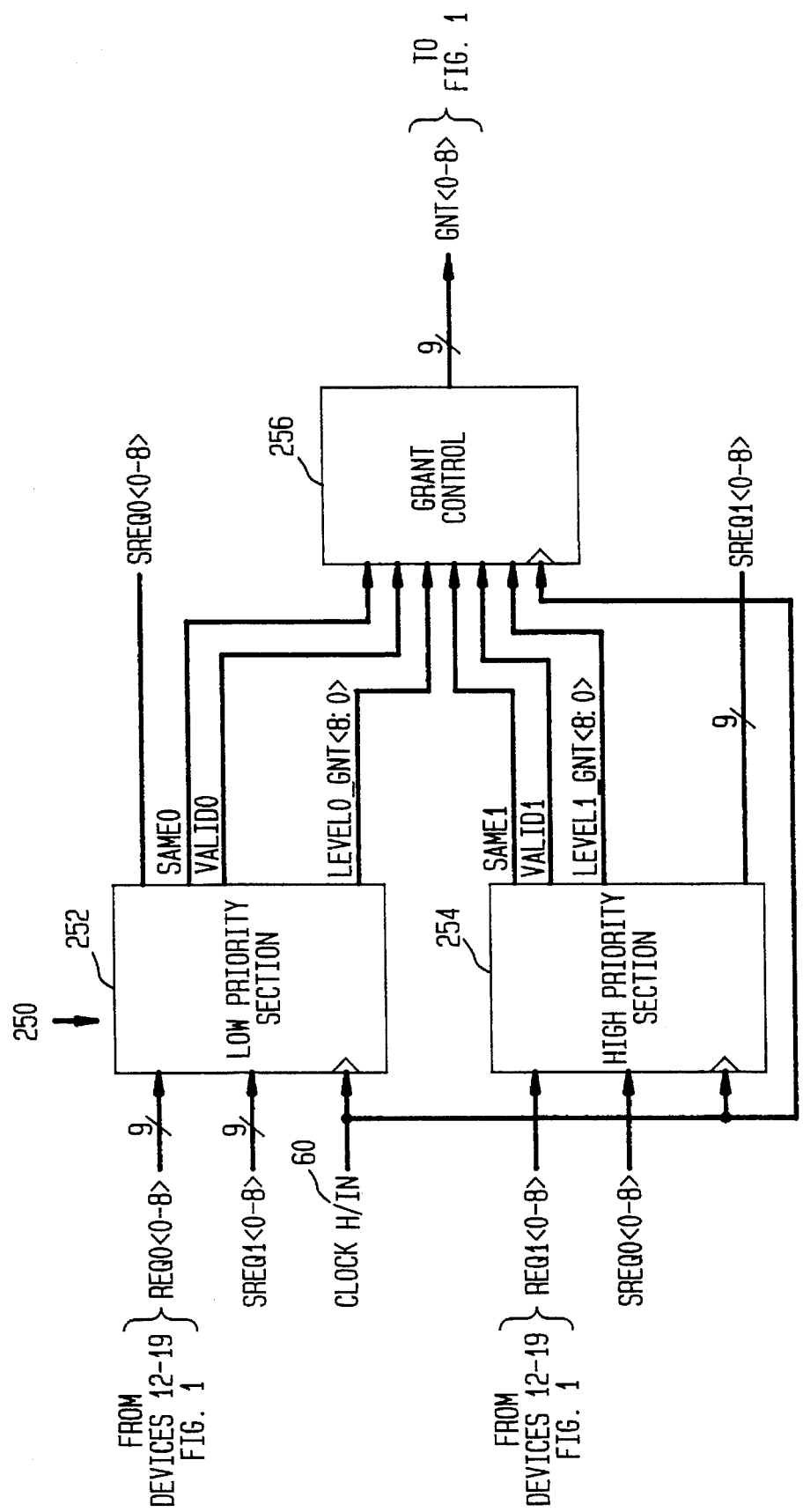

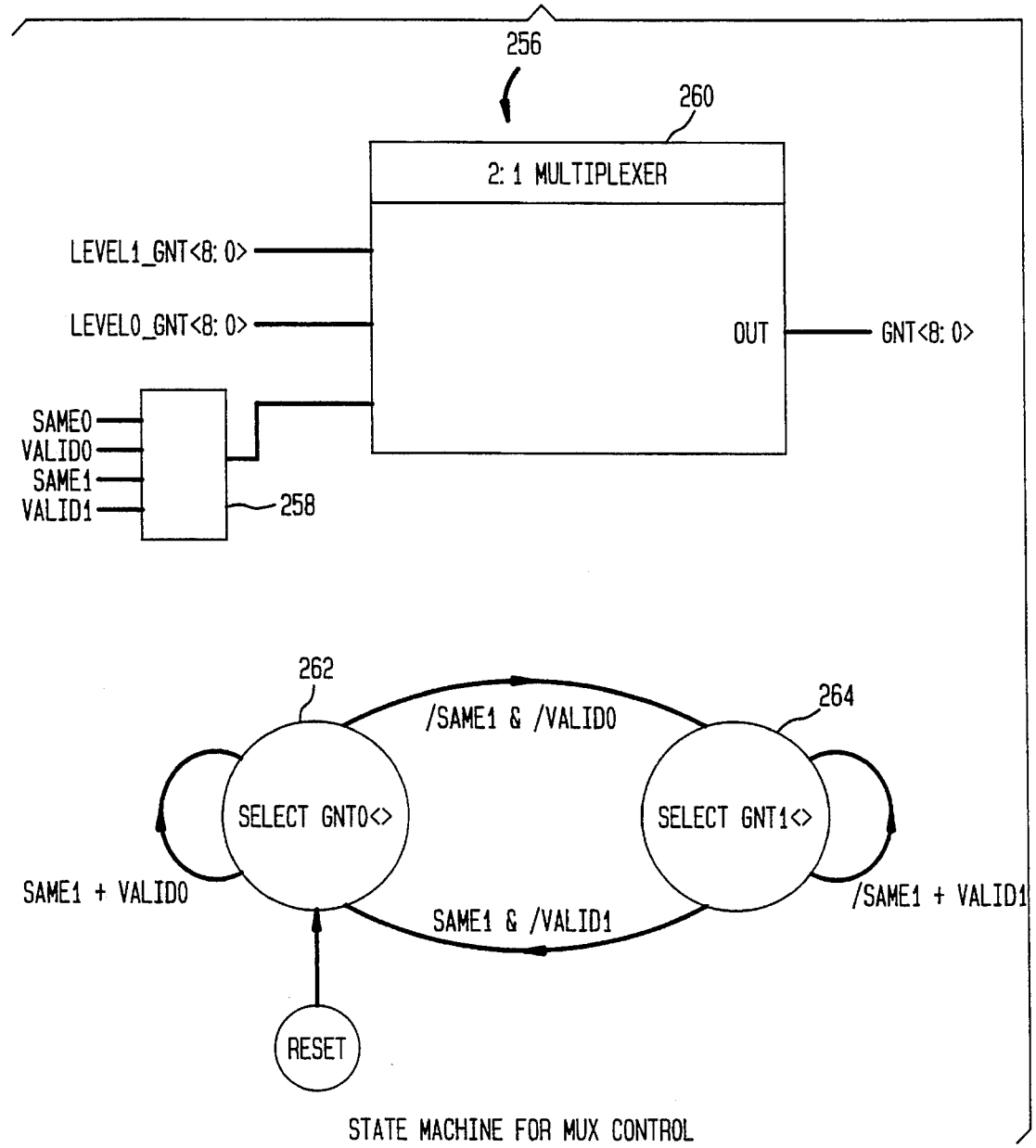

5,485,586

QUEUE BASED ARBITRATION USING A FIFO DATA STRUCTURE

This application is a continuation of application Ser. No. 07/819,187, filed on Jan. 10, 1992, now abandoned.

FIELD OF THE INVENTION

The present invention is directed to arbitration in a computer system and, more particularly, to a queue based arbiter that controls access to a bus by N devices.

BACKGROUND OF THE INVENTION

Modern computer systems often comprise a plurality of resources such as processors, memory and I/O controllers. Typically, such resources are coupled to one another by a system bus. While only one device at a time can access the system bus, it is possible that each resource can pose a bus request at any time. Accordingly, it is necessary to provide an arbitration scheme in the computer system which gives all resources fair access to the system bus when deciding which one of several devices that may be requesting access to bus will be granted control of the bus.

There are several known methods for implementing an arbitration scheme in a computer system. One such method is waiting for the bus to become free and then examining all devices that have requested access to the bus. The arbiter then grants the bus to the device according to an arbitration algorithm, e.g., round-robin, priority or least-recently used. Under these approaches, an arbiter may maintain historical information regarding previous bus masters as part of its algorithm.

Maintaining fairness is fundamental to arbiter design. Specifically, there is a need for an arbitration scheme that can provide fair access to a system bus while eliminating the need for maintaining a history of previous bus transactions.

SUMMARY OF THE INVENTION

The present invention provides a queue based arbiter to arbitrate between N devices of a computer system for access to a common resource, for example, a system bus. The arbiter according to the present invention eliminates the need to maintain a history of bus transactions by queuing bus requests to track when a bus request was posted. The arbiter then grants the bus to the device in the order dictated by the queued requests.

Generally, the operating environment of the present invention includes a computer system which comprises N devices coupled together by a system bus. The N devices can comprise processors, memory and I/O controllers. Each one of the N devices is individually coupled across the system bus to a central arbiter. It is via these individual paths that the N devices transmit a bus request signal to the arbiter and the arbiter issues a bus grant signal to the requesting device that is granted the system bus.

The arbiter of the present invention provides fair access to the bus by maintaining a queue of requests that come in from each device in the computer system. This is accomplished by continually sampling the individual request lines of the devices to determine if a device is requesting access to the bus. Each time the arbiter detects a request from a device it places an entry representative of the specific device that has requested the bus into a queue.

Whenever the arbiter detects that the previous bus master has released its request, the associated grant is cleared, and the arbiter advances to the next queue entry. If the queue is not empty, the appropriate grant signal is asserted to the respective requesting device.

The queue maintained by the arbiter has at least N entries where N equals the maximum number of devices which can request access to the system bus. By selecting the number of queue entries to be equal to the maximum number of devices that can request the bus, the present invention eliminates the possibility that a request cannot be queued because there is an entry available for each requesting device.

The operation of the arbiter of the present invention allows only a single grant to be issued at any instant of time so requests are queued one at a time. The arbiter resolves instances where simultaneous requests are received by a selection algorithm which determines the order by which the received requests are queued.

The present invention can also support a hierarchical request scheme where some requests are given priority over others. This is accomplished by maintaining separate queues for each level of hierarchy. Under such a scheme, all requests in a higher priority queue will be processed before requests from a lower priority queue are serviced.

BRIEF DESCRIPTION OF THE DRAWINGS

FIG. 6 illustrates an exemplary embodiment of the arbiter of the present invention configured to support a hierarchical scheme.

FIG. 7 illustrates an exemplary embodiment of the grant control logic illustrated in FIG. 6.

DETAILED DESCRIPTION

Figure 1:
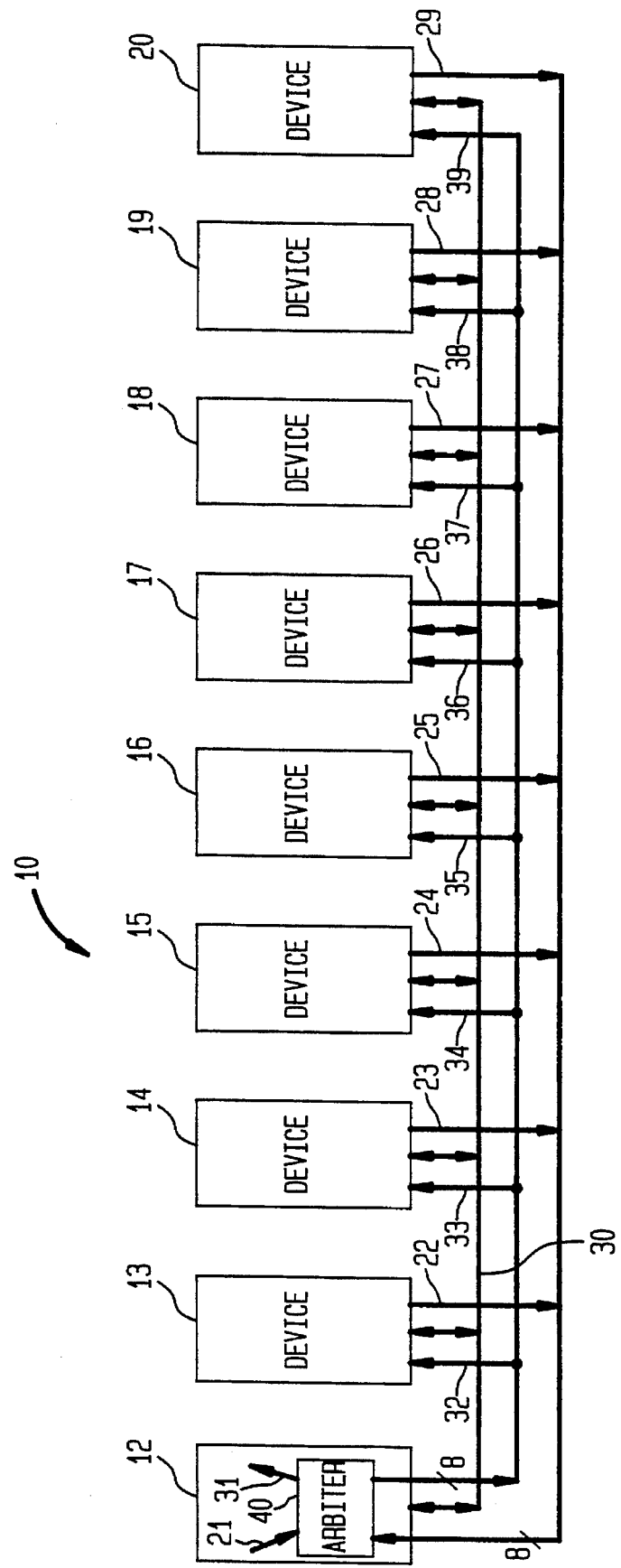
FIG. 1 illustrates an exemplary computer system comprising a plurality of devices coupled to a common bus and an arbiter according to the present invention.

Referring now to the drawings, and initially to FIG. 1, there is illustrated an exemplary embodiment of a computer system 10 comprising nine devices 12–20 coupled together by a bus 30. While only nine devices are shown, it should be understood that the present invention can support up to N devices coupled to the bus 30. Each of the devices 12–20 can be a processor that is coupled to the other processors by the bus 30.

As should be understood, only one of the devices 12–20 can control the bus 30 at any one time. Accordingly, an arbiter 40 is provided to manage access to the bus 30. The arbiter 40 is included on the device 12 for illustrative purposes only. It could be included on any one of the other devices 13–20 or be a stand alone device coupled to the bus 30.

Each of the devices 12–20 is coupled to the arbiter 40 by a request line 21–29, respectively and a grant line 31–39, respectively. When any one of the devices 12–20 requires access to the bus 30, it will assert a request signal on its respective request line 21–29. When the arbiter 40 grants the bus 30 to one of the devices 12–20, it will assert a grant signal on an appropriate one of the grant lines 31–39. The device 12–20 granted control of the bus 30 releases the bus 30 after completion of its bus transaction by de-asserting the request signal on its respective request line 21–29.

Figure 2:
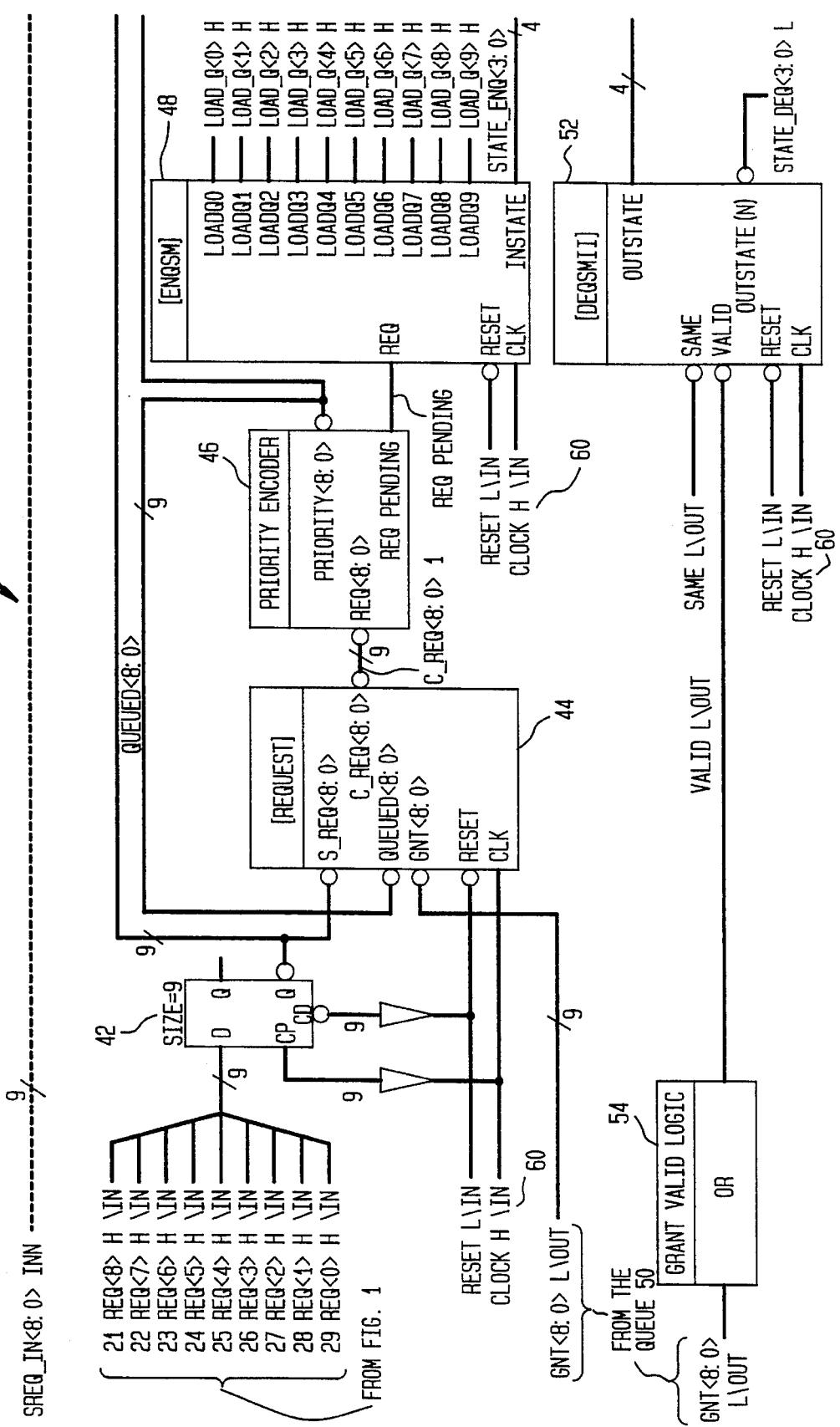
FIG. 2, 1 of 2 and 2, 2 of 2 illustrate an exemplary embodiment of an arbiter according to the present invention.

The arbiter 40 of FIG. 1 is illustrated in greater detail in FIG. 2. The arbiter 40 comprises a nine bit wide synchronization buffer 42, a request state machine 44, a priority encoder 46, an en-queuing state machine 48, a queue 50, a de-queuing state machine 52, grant valid logic 54 and comparator logic 56. The request lines 21–29 are coupled to inputs of the synchronization buffer 42 to synchronize the signals received on the request lines 21–29 with the operation of the arbiter 40. The synchronization buffer 42 is controlled by a clock signal, CLOCK H/IN 60, which also controls the request state machine 44, the en-queuing state machine 48, the queue 50, and the de-queuing state machine 52. Outputs of the synchronization buffer 42 are coupled to inputs of the request state machine 44 whose outputs are coupled to the priority encoder 46. Outputs of the priority encoder 46 are coupled to the en-queuing state machine 48, the queue 50 and are also fed back to the request state machine 44. The outputs of the queue 50 are coupled to the grant lines 31–39, the grant valid logic 54 and are also fed back to grant inputs of the request state machine 44. Load outputs of the en-queuing state machine 46 and state bits from the de-queuing state machine 52 are coupled to load inputs of the queue 50. State bits output from INSTATE outputs of the en-queuing state machine 46 and OUTSTATE outputs of the de-queuing state machine 52 are coupled to inputs of the comparator logic 56. The comparator logic 56 and the grant valid logic 54 provide inputs to the de-queuing state machine 52.

The request state machine 44 comprises nine, one bit wide, state machines that are utilized to pass synchronized requests received from the synchronization buffer 44 to the queue 50. Thus, there is one state machine for each request from the devices 12–20. The operation of the request state machine 44 is described below in conjunction with FIG. 3.

The priority encoder 46 is utilized in the arbiter 40 of the present invention to handle occasions when simultaneous requests are being processed by the arbiter 40. As illustrated, any requests posted by the devices 12–20 are captured in parallel into the synchronization buffer 42 each clock cycle. The requests captured are then processed by the request state machine 44 on the next clock cycle in parallel. If more than one request was passed from the synchronization buffer 42, more than one output of the request state machine 44 will be asserted indicating that more than one device 12–20 is requesting access to the bus 30. The priority encoder 46 is arranged so that only one request per clock cycle is passed to the Q IN inputs of the queue 50. It accomplishes this based upon a scheme which assigns priority in descending order, starting with the most significant bit on its input, C_REQ<8>. At the same time the priority encoder 46 passes a request to the queue 50, it asserts a request signal on its REQ PENDING output which informs the en-queuing state machine 48 that a request is pending.

The queue 50 of the arbiter 40 of the present invention comprises a memory device, e.g., first-in-first-out ("FIFO") memory, having at least N locations to store requests and associated control logic. By arranging the queue 50 to have N locations, there is a location for each one of the devices 12–20 that can request the bus 30. If each one of the devices 12–20 has a request outstanding, they can all be queued and no request is held off. Assuming all requests can be queued within a tenure time, no device can be granted the bus 30, relinquish the bus 30, request further access to the bus 30, and be queued ahead of other pending requests. This insures arbitration fairness between the devices 12–20.

The queue 50 of the exemplary embodiment has N+1 locations where request entries can be stored. N+1 locations are chosen for the queue 50 to simplify the task of determining if there are any entries in the queue as explained below.

The grant valid logic 54 is a logical OR of the grant lines 31–39 (GNT<8:0>) output by the queue 50 which provides a GRANT VALID signal to the de-queuing state machine 52. This signal is de-asserted when the currently active entry in the queue 50 is cleared due to the de-assertion of its associated request line 21–29.

The states of the en-queuing state machine 48 and the de-queuing state machine 52 are monitored by the comparator logic 56 to determine when the queue 50 is empty. This is accomplished by comparing the states of the en-queuing state machine 48 and the de-queuing state machine 52, and outputting the SAME signal when they are equal. Because the exemplary embodiment of the present invention utilizes a queue with N+1 entries, the SAME signal provides a simple mechanism for determining when the queue 50 is empty.

Each device 12–20 desiring control of the bus 30 holds its request signal asserted until it is granted control of the bus 30. The device may de-assert its request line at the end of its bus tenure, or during bus tenure where a two stage master/master-elect arbitration scheme is implemented. As illustrated in FIG. 2, the outputs of the synchronization buffer are also coupled to a RESET GNT<8:0> input of the queue 50. When the device 12–20 that currently controls the bus 30 de-asserts its request signal, the de-assertion sensed at the RESET GNT <8:0> input of the queue 50 causes the queue 50 to clear the entry in the queue 50 corresponding to the device 12–20. So that all the grant lines 31–39 are de-asserted, the output of the logical OR performed by the grant valid logic 54 will then be a de-asserted VALID signal.

The states of the en-queuing state machine 48 and the de-queuing state machine 52 indicate their associated pointer positions into the queue 50. The en-queuing state machine 48 advances its state whenever a REQ PENDING signal is asserted by the priority encoder 46 and loads the entry in the queue 50 corresponding to Q(n) output by the priority encoder 46. The de-queuing state machine 52 advances its state whenever both the VALID signal output by the grant valid logic 54 and the SAME signal output by the comparator logic 56 are not asserted indicating that there is no active grant and the queue is not empty.

The operation of the arbiter 40 is generally explained below in connection with FIGS. 1 and 2. A request from one of the devices 12–20, e.g., 12, is received by the arbiter 40 which is sampling the request lines 21–29 in parallel for a bus request signal on each cycle of the clock signal CLOCK H/IN 60. The individual requests enter the arbiter 40 and are first processed by the request state machine 44 and the priority encoder 46 to resolve instances where two requests are asserted simultaneously. If multiple requests are received by the priority encoder 46, only one request, Q IN<n>, is passed out to the queue 50 as explained above.

After the priority encoder 46 processes the request and asserts a REQ PENDING signal, the en-queuing state machine 48 de-asserts a respective load signal, LOAD 0 <n> to latch the appropriate request into the next available entry in the queue 50. As requests are placed in the queue 50 from the priority encoder 46, the same signals are fed back to the request state machine 44 to indicate that a particular request was queued.

Figure 3:
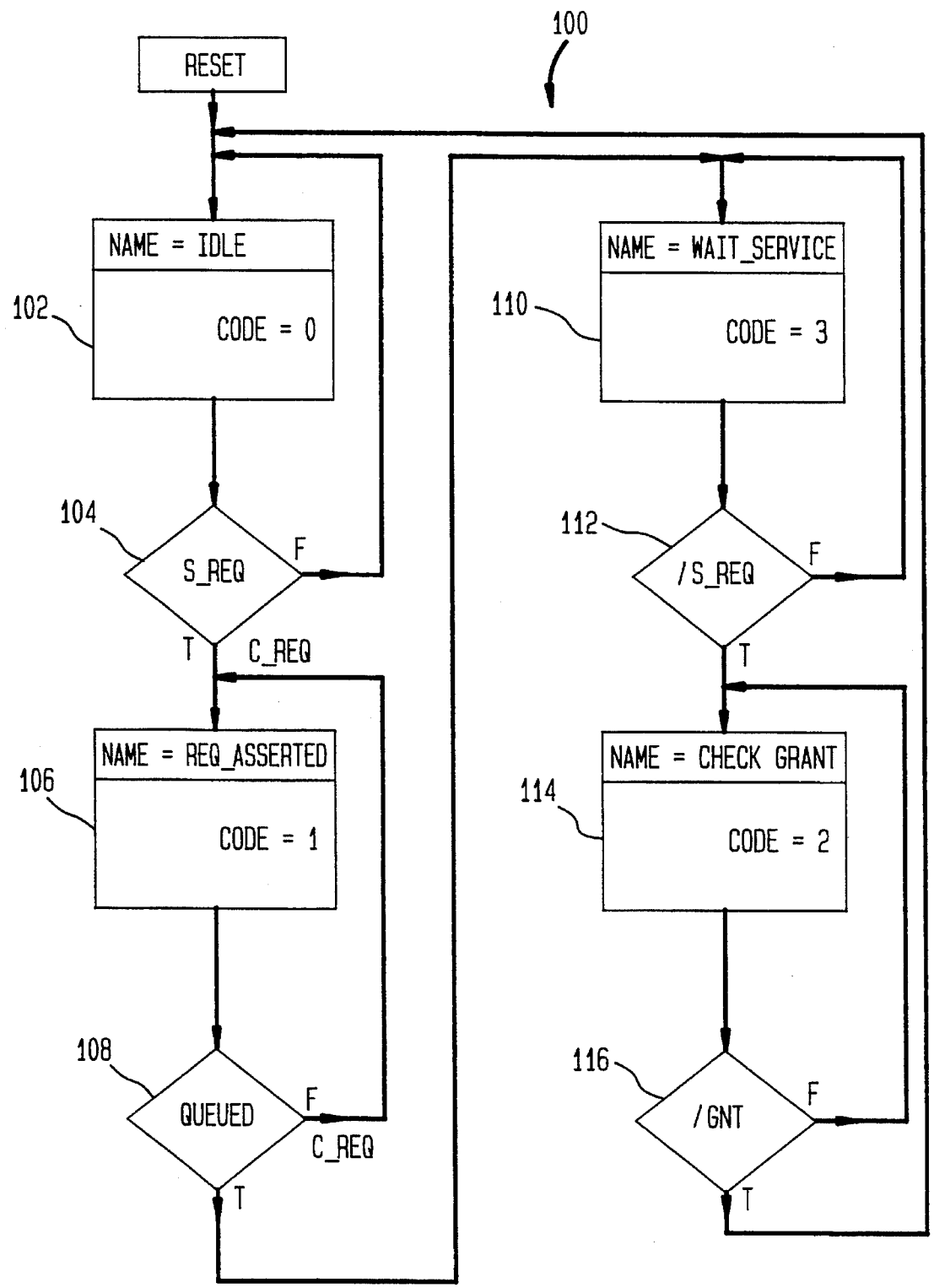
FIG. 3 is an exemplary state diagram illustrating the operation of the arbiter illustrated in FIG. 2.

Referring now to FIG. 3, there is illustrated a state diagram 100 illustrating the operation of the request state machine 44. The request state machine 44 is responsible for processing bus requests received from the devices 12–20. As illustrated, the request state machine 44 sequences though a series of states and decision loops as a result of the assertion or de-assertion of certain input signals on each cycle of the clock signal, CLOCK H/IN 60.

The state diagram illustrated in FIG. 3 represents the operation of the state machine 44 in processing a request received from one of the devices 12–20. It should be understood that there are nine sets of logic within the request state machine 44, each independently processing one of the incoming bus requests (S_REQ<n>) from the devices 12–20 according to the state diagram illustrated in FIG. 3.

The request state machine 44 enters the idle state after reset as indicated in block 102. The request state machine 44 remains in the idle state until a respective synchronized request (S_REQ<n>) is received (block 104) from the synchronization buffer 42 (FIG. 2). As soon as a synchronized request is received, the state of the request state machine 44 changes to the next state (block 106). Upon entering this state, the request state machine 44 generates a signal corresponding to the request signal received and passes it to the input of the priority encoder 46. The request state machine 44 then remains looping in this state between blocks 106 and 108 until it receives confirmation from the priority encoder 46, via the line coupling the output of the priority encoder 46 to the QUEUED<n> input of the request state machine 44, that the request has been stored in the queue 50.

After the priority encoder 46 processes the request signal, it outputs a priority signal (PRIORITY<n>) representative of the device 12–20 issuing the request to the Q IN<n> input of the queue 50 where it is stored and also to the QUEUED<n> input of the request state machine 44. When a priority signal is received, the request state machine 44 transitions to the next state (block 110) where it waits until the pending request has been serviced. This is indicated by the de-assertion of the request signal by the requesting device (block 112).

When the request signal is de-asserted (block 112), the request state machine 44 transitions to the next state (block 114) where it remains until the current grant signal is reset via the de-assertion of the respective request signal at the RESET GNT<n> input of the queue 50, which confirms that the transaction is complete (block 116). As illustrated in FIG. 2, the grant signal (GNT<n>) is coupled from the output of the queue 50 to the GNT<8:0> inputs of the request state machine 44 for control (block 116) of the transition from state 114 to the idle state 102.

Figure 4:
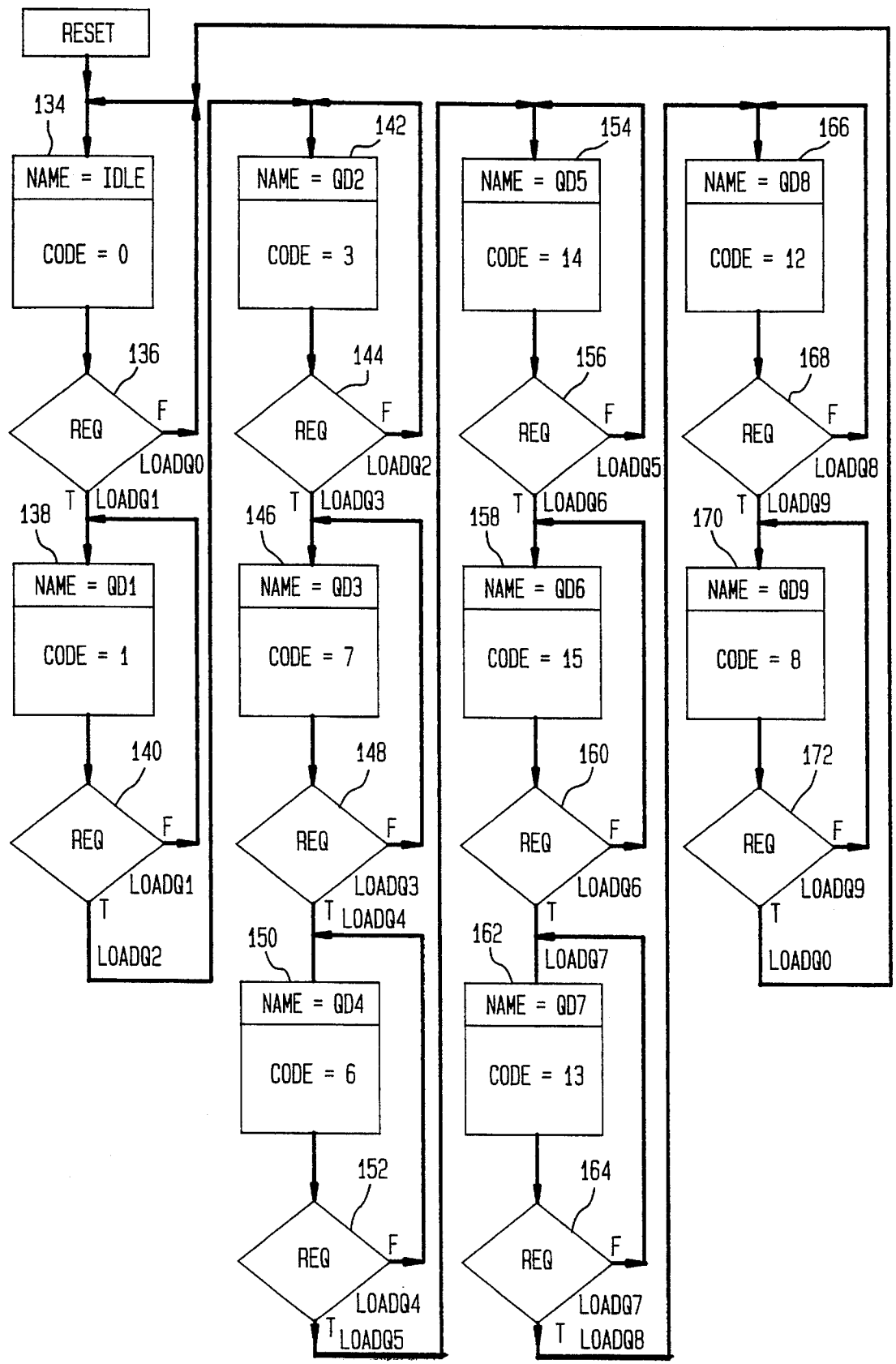
FIG. 4 is an exemplary state diagram illustrating how entries are added to the queue of the arbiter illustrated in FIG. 2.

Referring now to FIG. 4, there is illustrated a state diagram illustrating the operation of the en-queuing state machine 48. The en-queuing state machine 48 is responsible for loading entries representative of bus requests from the devices 12–20 into an appropriate location in the queue 50. As illustrated, the en-queuing state machine 48 sequences though a series of states as a result of the assertion or de-assertion of certain input signals on each cycle of the clock signal, CLOCK H/IN 60.

The en-queuing state machine 48 enters the idle state as indicated by block 134 after receiving a reset. Each of the states that the en-queuing state machine 48 sequences through generate one of the LOADQ<9:0> signals to store a request into an appropriate location in the queue 50.

The en-queuing state machine 48 maintains four bits which are representative of its state which is output to the comparator logic 56. The state bits also represent the next location in the queue 50 to be used for storing a request. The four state bits are modified when a new entry is loaded in the queue 50. The four bit signal is indicated by the value of the variable code indicated in blocks 134, 138, 142, 146, 150, 154, 158, 162, 166 and 170. The code represents the decimal value of the state of the en-queuing state machine 48. The exemplary embodiment of the arbiter 40 represents the states as Gray coded values so that only one bit is changed at a time to avoid hazards when demuxing grant outputs.

The en-queuing state machine 48 sequences through the states as indicated by blocks 134–172 to store requests into the queue 50. In each of the states 134–172, the en-queuing state machine 48 de-asserts a corresponding one of the LOADQ<9:0> signals coupled to the load inputs of the queue 50 to latch the appropriate request, PRIORITY<n>, into the next available entry in the queue 50. This sequence of states continuously repeats so that after the LOADQ9 signal is generated in block 172, control passes back to block 134 so that the sequence of states can be repeated. The transition from state to state represented by blocks 134, 138, 142, 146, 150, 154, 158, 162, 166 and 170 is controlled by the decision blocks 136, 140, 144, 148, 152, 156, 160, 164, 168 and 172, respectively. The en-queuing state machine 48 remains in a particular state until REQ PENDING is asserted by the priority encoder 46, as determined in the decision blocks via the coupling of the REQ PENDING output of the priority encoder 46 and the REQ input of the en-queuing state machine 48.

Figure 5:
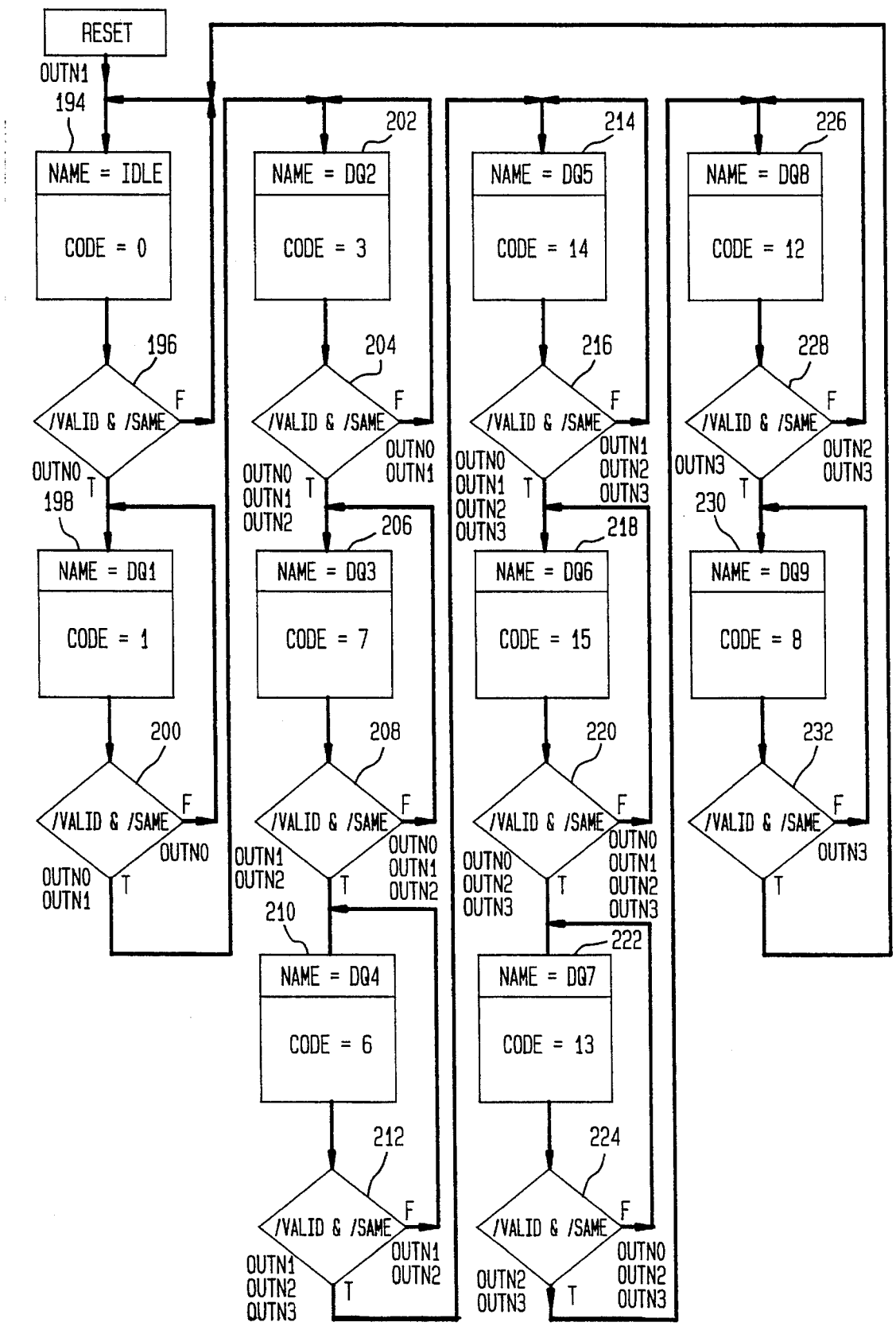
FIG. 5 is an exemplary state diagram illustrating how entries are removed from the queue of the arbiter illustrated in FIG. 2.

Referring now to FIG. 5, there is illustrated a state diagram illustrating the operation of the de-queuing state machine 52. The de-queuing state machine 52 is responsible for controlling the output GNT<8:0> of the queue 50. The entry decoded by the state of the de-queuing state machine 52 indicates which entry in the queue 50 is output to thereby grant the bus 30 to the appropriate one of the devices 12–20. As illustrated, the de-queuing state machine 52 sequences though a series of states on each cycle of the clock signal CLOCK H/IN 60 as a result of the assertion or de-assertion of certain input signals.

The de-queuing state machine 52 is controlled by two input signals: SAME and VALID. The SAME signal is generated by the comparator logic 56 as a result of the comparison of the state of the en-queuing state machine 48 and the de-queuing state machine 52 to indicate when the queue 50 is empty. The VALID signal indicates the current entry in the queue 50 is still valid, i.e., grant is still asserted to the requesting device.

The de-queuing state machine 52 enters the idle state as indicated by block 194 after receiving a reset. The de-queuing state machine 52 cycles through the same state sequence as the en-queuing state machine 48, accessing (pointing to) the entry in the queue 50 representative of the oldest bus request entry in the queue 50. Both true OUT-STATE<3:0> and complemented OUTSTATEN<3:0> state bits are used to decode the entry in the queue 50. This causes a corresponding GNT<8:0> signal to be generated by the queue 50 and then transmitted to the requesting device 12–20 across the respective grant lines 31–39 to indicate to the device 12–20 that it has been granted the bus 30.

The state bits of the de-queuing state machine 52 are also used by the comparator logic 56 to generate the SAME signal. The four bit signal is indicated by the value of the variable code indicated in blocks 194, 198, 202, 206, 210, 214, 218, 222, 226 and 230. The exemplary embodiment of the arbiter 40 represents the states as Gray coded values to avoid hazards when demuxing grant outputs. It should be noted that the states of the en-queuing state machine 48 as shown in blocks 134, 138, 142, 146, 150, 154, 158, 162, 166 and 170 correspond to the states shown in blocks 194, 198, 202, 206, 210, 214, 218, 222, 226 and 230 of the de-queuing state machine 52.

The transition from state to state represented by blocks 194, 198, 202, 206, 210, 214, 218, 222, 226 and 230 is controlled by the decision blocks 196, 200, 204, 208, 212, 216, 220, 224, 228 and 232, respectively. The de-queuing state machine 52 remains in a particular state until the VALID and the SAME signals are de-asserted, as determined in the respective decision blocks via the coupling of the de-queuing state machine 52 to the VALID and SAME outputs of the comparator 56 and the grant valid logic 54, respectively.

As is clear from the foregoing discussion, the oldest entry in the queue 50 is the entry pointed to by the current state of the de-queuing state machine 52. So just by stepping through the queue 50 in order, the present invention is able to track the oldest entry. The present invention avoids pointer overlap (i.e., in and out pointers) since the queue 50 is large enough to accommodate all requests.

The present invention is also capable of supporting a hierarchical request scheme. High priority and low priority requests are utilized to implement the scheme. High priority requests are queued in time order with other high priority requests. Similarly, low priority requests are queued in time order with other low priority requests. If there are any high priority requests pending, the low priority requests are ignored.

A hierarchical request scheme, e.g., a two level scheme, utilizing the exemplary embodiment of the arbiter 40 illustrated in FIG. 2, is achieved by having two sets of logic, a high priority section and a low priority section, to handle the two levels of requests from each device. Essentially this is accomplished by duplicating the arbiter 40 as illustrated in FIG. 2 where each section of the logic handles one priority level of requests. A grant control logic section is also added to this arrangement to control the switching between the two priority logic sections as discussed below.

In one embodiment, each one of the devices 12–20 (FIG. 1) would have two request lines, one for each priority. The request lines would be coupled to the appropriate arbiter logic section to enable that level of priority requests to be queued.

Referring now to FIG. 6, there is illustrated in block diagram form, an exemplary embodiment of the arbiter of the present invention configured to support a hierarchical, two priority level scheme. As shown, the arbiter 250 comprises a low priority section 252, a high priority section 254 and a grant control logic section 256. The low priority request lines from the devices 12–20 (FIG. 1) are coupled to inputs of the low priority section 252 and the high priority request lines from the devices 12–20 (FIG. 1) are coupled to inputs of the high priority section 254. Synchronized requests, SREQ1<0–8> and SREQ0<0–8> are cross coupled between the low priority section 252 and the high priority section 254 and are illustrated as dotted lines in FIG. 2. They are used in conjunction with the local synchronized requests, REQ1<0–8> and REQ0<0–8>, to clear queue entries. Both request lines from a device must be de-asserted in the exemplary embodiment before its associated grant will be de-asserted.

The low priority section 252, the high priority section 254 and the grant control logic 256 are controlled by the clock signal CLOCK H/IN 60. Each priority section is coupled to the grant control logic 256 to transmit its own SAME, VALID and LEVELN_GNT<n> signals to the grant control logic 256. The SAME and VALID signals are identical to and perform the same function as the signals in FIG. 2. These signals are utilized by the grant control logic 256 to determine which section has requests pending as described below.

Referring now to FIG. 7, there is illustrated, an exemplary embodiment of the grant control logic 256 for implementing a two level priority scheme. As illustrated, the grant control logic 256 has a state machine 258 and a two to one multiplexer 260 associated with it that controls whether the low priority section 252 or the high priority section 254 can grant access to the bus 30 to requesting devices. The state machine 258 causes the operation of the arbiter 250 to jump between the low and high priority queues in the low and high priority logic sections 252 and 254 to grant the bus 30 to requesting devices.

If both queues are empty, then the first queue that receives a request grants the bus 30 to the requesting device. After this, if any requests are received in the high priority queue, the grant control logic 256 transfers control to the queue in the high priority logic section 254 of the arbiter after the current device relinquishes the bus 30. The grant control logic 256 accomplishes this by always checking the high priority queue before granting the next pending request in the low priority queue. Once there are entries in the high priority queue, the grant control logic 256 will cause the arbiter 40 to stay there until high priority requests are exhausted before returning to the low priority queue. The two-state state machine 258 is used directly as a control bit for the two to one multiplexer 260 to select a level one or level zero grant to be returned to the devices 12–20 on lines 31–39 of FIG. 1. SAME0 is a redundant signal in the grant control logic.

The state diagram in FIG. 7 illustrates the operation of the state machine 258. As illustrated, the state machine 258 toggles between two states, 262 and 264, which grants control to either the low priority section 252 or the high priority section 254.

After reset, the state machine 258 remains in the state indicated by reference numeral 262 where it grants control to the low priority section 252. It will remain in this state as long as the signals SAME1 or VALID0 are asserted. When these signals are de-asserted, the state machine 258 transitions to the state indicated by reference numeral 264 to grant control to the high priority section 254. It remains in this state as long as the signal SAME1 is de-asserted or the signal VALID1 is asserted. When SAME1 is asserted and VALID1 is de-asserted, the state machine transitions back to the state indicated by reference numeral 262.

What is claimed is:

1. An apparatus for allocating access to a common resource to one of N devices, each of the N devices asserting an access request signal when seeking access to the common resource, the apparatus comprising:

a clock for generating clock pulses one pulse being generated each clock cycle;

a request state machine for receiving the access request signals asserted by each of the N devices and for generating a request pending signal indicative of one of the N devices seeking access to the common resource, the request state machine comprising (i) a request buffer for storing access request signals generated during a single clock cycle, and (ii) a priority encoder coupled to the request buffer, the priority encoder operating to prioritize the access request signals stored in the request buffer and to generate the request pending signal in response to the one of the stored access request signals that is determined to have the highest priority;

a queuing state machine coupled to the request state machine for generating a value in response to the request pending signal, the value representing the identity of one of the N devices seeking access to the common resource;

a queue coupled to the queuing state machine, the queue having at least N storage locations, said queue receiving the value generated by the queuing state machine and storing the value in one of the at least N storage locations in accordance with a first-in, first-out (FIFO) data access scheme;

a request grant control logic block coupled to the common resource for monitoring access to the common resource and generating a signal indicative of resource availability; and a de-queuing state machine coupled to the request grant control logic block and to the queue for reading out the values stored in the queue in accordance with the first-in, first-out data access scheme upon receiving the signal indicative of common resource availability from the request grant logic block and granting the device identified by the value read out of the queue access to the common resource.

2. The device of claim 1, wherein the common resource is a bus.

3. The apparatus of claim 2, wherein the single clock cycle is a single bus clock cycle.

4. The device of claim 3 wherein the de-queuing state machine clears the value read out of the queue from the queue storage location upon granting the device identified by the value read out of the queue access to the common resource.

5. The apparatus of claim 1, wherein:

said queue has N+1 storage locations, said queuing state machine has a pointer for pointing to the storage location of the queue where the value representing the next one of the N devices seeking access to the common resource is to be stored, said de-queuing state machine has a pointer for pointing to the storage location of the queue from which the next value is to be retrieved, said value to be retrieved representing the one of the N devices seeking access to the common resource having the highest priority, and said request grant control logic block compares the pointer location of the queuing state machine with the pointer location of the de-queuing state machine, and determines that said queue is empty when said pointing locations are equal to each other.

6. A method of allocating access to a common resource to one of N devices, comprising the steps of:

receiving an access request from each of the N devices seeking access to the common resource;

storing all access requests received at the same time in a buffer;

prioritizing the access requests stored in the buffer in accordance with a preselected prioritization scheme;

storing the prioritized access requests in a first-in, first-out ("FIFO") data structure in the order of highest priority access request to lowest priority access request;

monitoring access to the common resource to determine when the common resource is available for accessing by one of the N devices, the step of monitoring comprising determining when none of the N devices is accessing the common resource; and upon determining that the common resource is available for accessing by one of the N devices, retrieving the access request from the first-in, first-out data structure that has been stored for the longest period of time, granting the one of the devices that generated the retrieved access request access to the common resource, and clearing the retrieved access request from the first-in, first-out data structure.

7. The method of claim 6, wherein the common resource is a bus and the step of monitoring access to the bus comprises the step of monitoring the bus to determine when none of the N devices is accessing the bus.

8. An apparatus for allocating access to a common resource to one of N devices, each of the N devices asserting an access request signal when seeking access to the common resource, the apparatus comprising:

a clock for generating clock pulses, one pulse being generated each clock cycle;

a request state machine for receiving the access request signals asserted by each of the N devices and for generating a request pending signal indicative of one of the N devices seeking access to the common resource, the request state machine comprising (i) a request buffer for storing access request signals generated during a single clock cycle, and (ii) a priority encoder coupled to the request buffer, the priority encoder operating to prioritize the access request signals stored in the request buffer and to generate the request pending signal in response to the one of the stored access request signals that is determined to have the highest priority;

a queuing state machine coupled to the request state machine for generating an access request value in response to the request pending signal, the access request value representing the identity of one of the N devices seeking access to the common resource;

a queue coupled to the queuing state machine and having N+1 storage locations, said queue receiving the access request value generated by the queuing state machine and storing the access request value in one of the N+1 storage locations in accordance with a first-in, first-out (FIFO) data access scheme, said queuing state machine including a first pointer for pointing to the storage location of the queue where the access request value representing the next one of the N devices seeking access to the common resource is to be stored, and in response to the generation of an access request value said queuing state machine updates said first pointer to point to a storage location where an access request value representing a subsequent one of the N devices seeking access to the common resource is to be stored;

a request grant control logic block coupled to the common resource for monitoring access to the common resource and generating a signal indicative of resource availability; and a de-queuing state machine coupled to the request grant control logic block and to the queue for reading out the access request values stored in the queue in accordance with the first-in, first-out data access scheme upon receiving the signal indicative of common resource availability from the request grant logic block and granting the device identified by the access request value read out of the queue access to the common resource, said de-queuing state machine having a second pointer for pointing to the storage location of the queue from which the next access request value is to be retrieved, said access request value to be retrieved representing the one of the N devices seeking access to the common resource having the highest priority, and in response to said signal indicative of common resource availability said de-queuing state machine updates said second pointer to point to a storage location from which a subsequent access request value is to be retrieved, said subsequent access request value to be retrieved representing the one of the N devices seeking access to the common resource having the highest priority that has not yet been granted access to said common resource, wherein said request grant control logic block compares the first pointer location with the second pointer location, and determines that said queue is empty when said pointing locations are equal to each other.

* * * * *